Chilcott & Snells,
Boot Upper,

№ 477, Reissued July 7, 1857.

N. PETERS, PHOTO-LITHOGRAPHER, WASHINGTON, D. C.

UNITED STATES PATENT OFFICE.

JOHN CHILCOTT AND ROBERT SNELL, OF BROOKLYN, NEW YORK.

IMPROVEMENT IN THE METHOD OF CUTTING OUT THE UPPERS OF BOOTS AND SHOES.

Specification forming part of Letters Patent No. 10,009, dated September 13, 1853; Reissue No. 477, dated July 7, 1857.

*To all whom it may concern:*

Be it known that we, JOHN CHILCOTT and ROBERT SNELL, of Brooklyn, in the county of Kings and State of New York, have invented a new and useful Improvement in the Manufacture of Boots; and we do hereby declare that the following is a full, clear, and exact description of the same, reference being had to the accompanying drawings, forming part of this specification, in which—

Figure 1:
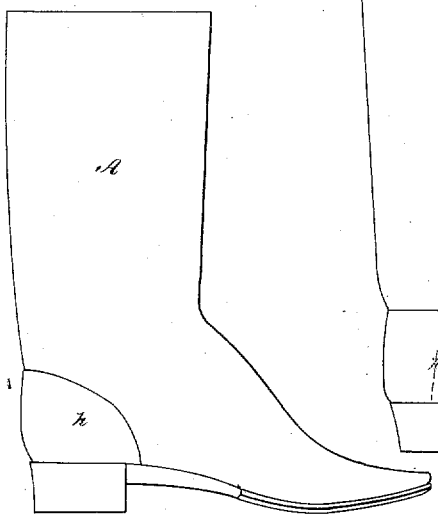
Figure 3:
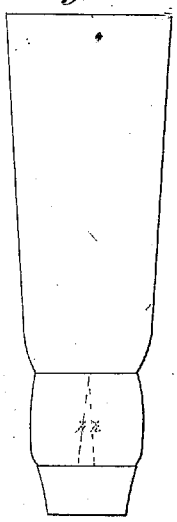
Figure 2:
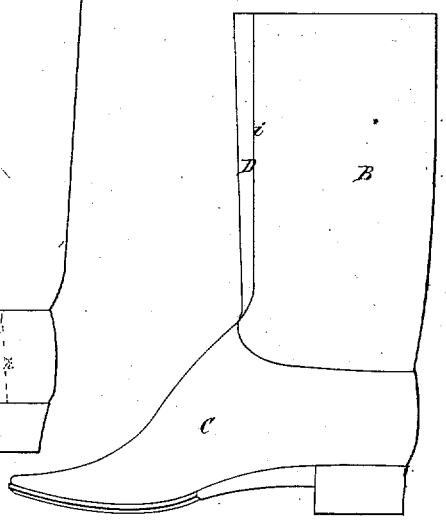
Figure 4:
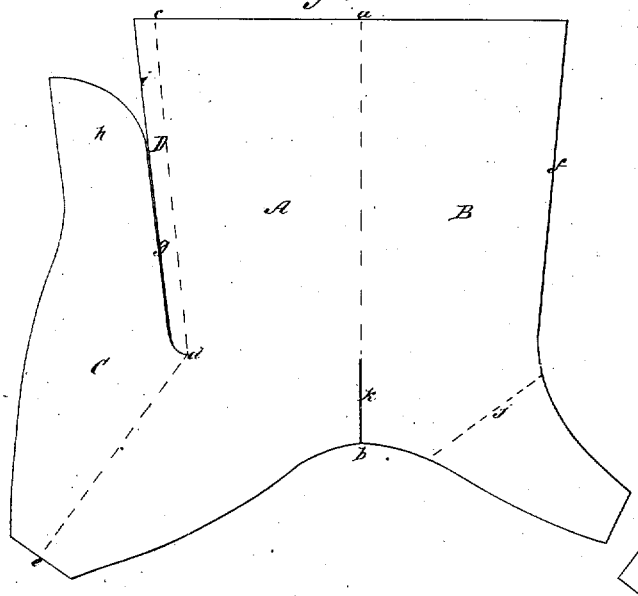
Figure 5:
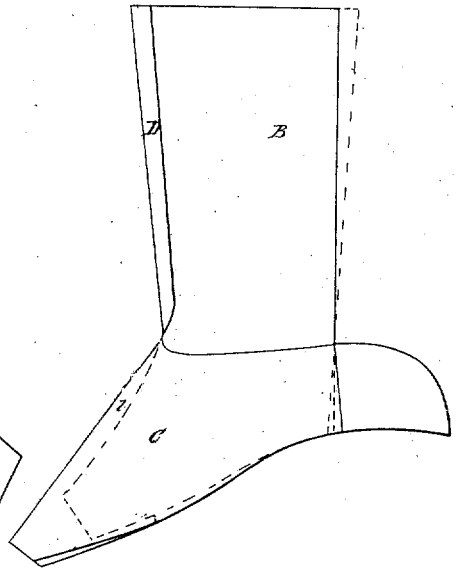

Figure 1 is a side view of a boot made according to our improvement. Fig. 2 shows the opposite side of the same. Fig. 3 is a back view of the same. Fig. 4 shows the shape of the piece of leather or other material from which the "upper" of the boot is made. Fig. 5 shows the piece partly folded in the form of a boot.

Similar letters of reference indicate corresponding parts in the several figures.

In the manufacture of boots as at present carried on the fronts require to undergo the process of crimping, which is a very laborious and consequently expensive operation, and weakens the leather to a very great degree. It moreover precludes the employment of any material that is inelastic or that would be impaired by stretching, unless the boot be made in several pieces—the fronts (themselves, as considered separately from the backs) requiring at least two pieces, as in the case of patent-leather boots manufactured in the common way. The manufacture of boots without crimping and without making the front in two pieces has been attempted in France as far back as the year 1842, by M. M. Thomas and Hairion, who made the uppers each of a single piece of leather, with the exception of a gusset, which was inserted in one side to make it complete. But in these boots, though they might have been fitted to the front part of any foot, no provision was made for fitting the ever-varying sizes of the leg and heel; and in many cases the part of the boot, technically termed the "nick," instead of fitting closely into the junction between the top of the foot and the leg, must have been half-way down the instep. In other cases it would not have been possible to fit the boot to the heel so that it would retain its proper position. Boots have also been made in Belgium from one piece of leather without crimping and without the addition of a gusset, but these are liable to the same objections as above named.

Our invention consists in a certain new mode of cutting out or otherwise forming a piece of leather or other material so that it may be folded without crimping and without the addition of other pieces to take the required form of what is commonly termed the "upper" of a boot, to fit any foot, heel, and leg not positively deformed with the greatest accuracy. Another very important result obtained by this mode of cutting out or forming the upper is that when the piece of leather or other material is folded up the closing can be entirely performed by a sewing-machine, as the edges that require to be sewed all form laps on the exterior of the boot.

To enable others skilled in the art to use our invention, we will proceed to describe it with reference to the drawings.

The piece cut or otherwise made of the form shown in Fig. 4 is suitable for a boot for the right or left foot; but as one side of a boot made in this way presents a somewhat neater appearance than the other, we make one from a piece of a form precisely the reverse of the other, and this enables us to bring the neater side of the boot, which is seen in Fig. 2, to the outside of the foot. The view Fig. 4 shows the inside of a piece to form a boot for the left foot. The part A, included between the lines *a b c d* and *d e*, will form one entire side of the boot. The part B, between the lines *a b* and the edge *f*, will form the other side of the leg and heel, and will extend partly along the side of the foot; but this part may be cut off anywhere below the red line *j*, so as not to reach beyond the side of the heel. The part C, divided off by the line *d e* and the cut *g* will form the side of the foot to unite with the side B of the leg and leave a piece, *h*, to go round the heel to the side A. The piece D, between the line *c d*, the cut *g*, and the edge *i*, forms a lap for the front seam. A cut, *k*, is made in the line *a b* to about the height of the top of the heel. To form the boot the piece is folded in the line *a b* to lay the part B on the part A, the edge *f* being brought even with the line *c d*. The lap D is then folded over the edge *f*, and the part C is folded in the line *d e* and laid over the lower parts of A and B. The piece in the state now described is exhibited in Fig. 5, where the edge of the curved part of B is indicated by a dotted line, *l m*, supposed to be seen through C. The part *h* then requires to be turned round the heel, and the boot is then ready for closing either by stitching, cementing, or other means of fastening, and when closed it receives the sole, as usual.

The rules for fitting boots in this manner are substantially the same as for fitting those made in the usual way. The angle formed by the lines *c d* and *d e* will have to be varied to suit the height of the instep of the wearer, and will also depend in a measure upon the height of the heel of the boot. The cut *k* will in almost every case require to be opened—that is to say, to have the sides parted, as shown by the dotted lines in Fig. 3, to give the necessary form to the heel, and the opening will be covered by the piece *h*, the width of such opening depending on the size of the heel, a broad or long heel requiring a greater opening than a narrow or short one. The red line in Fig. 5 shows the difference in shape, in profile, required for a larger leg with the same-sized foot, and it is there shown by the dotted part of the said line that if the heel were made without opening, as in M. M. Thomas's and Hairion's, the form would be such that the boot could not retain its position on the heel, but would have a tendency to slip off. The blue line on the heel in the same figure shows the form that may be given by slitting the lower part of the back and properly turning the part *h*.

No waste of leather is involved by making the heel double, as the double part will give all or nearly all the necessary stiffening.

The form of the piece of material from which the upper is made may be modified to a certain extent. We sometimes bring the front lap-piece, D, inside the piece B, and in that case we cut out the piece indicated by D in Fig. 4 in the drawings, but leave a piece of corresponding form outside the line there indicated by *f*.

A short boot may be made by omitting a suitable portion of the upper part of the piece. (Shown in Fig. 4.)

It is obvious that a piece of the form substantially as shown in Fig. 4 and hereinabove described may be made by joining two or more pieces together, and we will therefore state that we consider the union of two or more pieces of the same or of different materials to produce that or a substantially similar form to be equivalent to making the same form in one piece.

We do not claim, generally, the manufacture of boots without crimping; but

What we do claim as our invention, and desire to secure by Letters Patent, is—

Cutting or otherwise making the leather or other material to form the upper of a boot by folding, without crimping, of the form substantially as shown in Fig. 4, and having its characteristics herein fully described, whether the said form be produced by a single piece of material or by the union of two or more pieces.

JOHN CHILCOTT.
ROBERT SNELL.

Witnesses:

FRANK JENKS,
ABRAHAM LOTT.